(12) United States Patent
Yada

(10) Patent No.: US 6,898,229 B2
(45) Date of Patent: May 24, 2005

(54) GAS CIRCULATION FAN FOR EXCIMER LASER APPARATUS

(75) Inventor: Yuuji Yada, Iwata (JP)

(73) Assignee: NTN Corporation, Osaka (JP)

( * ) Notice: Subject to any disclaimer, the term of this patent is extended or adjusted under 35 U.S.C. 154(b) by 326 days.

(21) Appl. No.: 10/222,999

(22) Filed: Aug. 19, 2002

(65) Prior Publication Data

US 2003/0039292 A1 Feb. 27, 2003

(30) Foreign Application Priority Data

Aug. 21, 2001 (JP) ........................................ 2001-250596

(51) Int. Cl.[7] .............................................. H01S 2/22
(52) U.S. Cl. ......................................... 372/58; 372/78
(58) Field of Search .................. 372/55–65, 38.1–38.09

(56) References Cited

U.S. PATENT DOCUMENTS

| | | | |
|---|---|---|---|
| 5,760,511 A | * | 6/1998 | Nakagawa et al. ........ 310/90.5 |
| 5,848,089 A | | 12/1998 | Sarkar et al. .................. 372/58 |
| 6,104,735 A | * | 8/2000 | Webb ............................ 372/37 |
| 6,337,872 B1 | * | 1/2002 | Nara et al. ..................... 372/58 |
| 6,597,719 B1 | * | 7/2003 | Nara et al. ..................... 372/55 |
| 6,700,235 B1 | * | 3/2004 | McAfee ........................ 310/52 |
| 6,809,448 B2 | * | 10/2004 | Suzuki et al. .............. 310/90.5 |
| 6,813,301 B2 | * | 11/2004 | Ozaki et al. ................... 372/58 |

FOREIGN PATENT DOCUMENTS

JP 11-303793 11/1999

* cited by examiner

*Primary Examiner*—Minsun Oh Harvey
*Assistant Examiner*—Phillip Nguyen
(74) *Attorney, Agent, or Firm*—McDermott Will & Emery LLP

(57) ABSTRACT

In a gas circulation fan, a main shaft is supported in a non-contact manner, by magnetic bearings. Between each of the magnetic bearings and a controller, a relay is provided. Each relay includes a position detection sensor circuit, an offset adjuster, a feedback gain adjuster and a filter circuit. Thus, compatibility between a mechanical body unit and the controller is attained.

6 Claims, 6 Drawing Sheets

GAS CIRCULATION FAN FOR EXCIMER LASER APPARATUS

BACKGROUND OF THE INVENTION

1. Field of the Invention

The present invention relates to a gas circulation fan for an excimer laser apparatus. More specifically, the present invention relates to a gas circulation fan for an excimer laser apparatus that emits laser, by circulating halogen gas such as fluorine gas.

2. Description of the Background Art

In a conventional excimer laser apparatus, rolling bearing has been used as a bearing for the laser gas circulation fan. Generation of an impurity gas resulting from a reaction between the halogen gas such as fluorine included in the laser gas and bearing lubricant, and generation of dust from rolling surface of the bearing ball, however, degraded laser gas, affecting the laser output. As a solution to this problem, recently, a magnetic bearing has come to be used.

FIG. 6 is a block diagram showing a configuration of a mechanical body unit and a controller of a conventional magnetic bearing apparatus for the gas circulation fan. Referring to FIG. 6, on a main shaft 1, a fan 2 is attached, forming a rotary body 3. Gas 21 is circulated, as fan 2 rotates in a chamber 20. Rotary body 3 has one side pivotally supported by a magnetic bearing 41, and the other side pivotally supported by a magnetic bearing 42. Magnetic bearing 41 on one side includes an electromagnet 51 positioned in a housing 23 and supporting, in non-contact manner, one side of rotary body 3, and a position sensor 61 detecting position of rotary body 3. Magnetic bearing 42 on the other side includes an electromagnetic 52 positioned in a housing 24 and supporting, in a non-contact manner, the other side of rotary body 3, and a position detection sensor 62 detecting the position of rotary body 3.

Magnetic bearings 41 and 42 are connected to a controller 7 through cables 81 and 82, respectively. Controller 7 includes a position detection sensor circuit 9 processing signals from position sensors 61 and 62 and converts an amount of displacement of rotary body 3 to a voltage ratio; an offset adjuster 10 electrically correcting position mechanical deviation from the center of the floating position of rotary body 3; a sensor feedback gain adjuster 11 adjusting gain of an output representing displacement of position detection sensor circuit 9; a filter circuit 12 for reducing bending natural frequency or the like of rotary body 3; a phase compensating circuit 13 for stabilizing control system; and a power circuit 14 supplying current to electromagnets 51 and 52.

In the conventional magnetic bearings 41 and 42 shown in FIG. 6, when a characteristic of mechanical body unit 25 such as a bearing gap or a main shaft natural frequency changes because of variation in processing accuracy, for example, position detection sensor circuit 9, offset adjuster 10, sensor feedback gain adjuster 11 and filter circuit 12 must be finely adjusted to address the change of mechanical body unit 25, and it has been difficult to maintain compatibility between mechanical body unit 25 and controller 7. For example, when controller 7 fails and is exchanged by a new controller, various portions of controller 7 must newly be adjusted. This is very troublesome in adjusting and maintaining the apparatus, and has an influence on productivity of the apparatus.

SUMMARY OF THE INVENTION

Therefore, an object of the present invention is to provide a gas circulation fan of an excimer gas laser apparatus, in which a mechanical body unit and a control circuit have full compatibility.

The present invention provides a gas circulation fan for an excimer laser apparatus in which laser gas in a chamber is circulated by fan rotation, including: a rotary shaft on which the fan is attached; a controllable magnetic bearing supporting, in non-contact manner, the rotary shaft; a control circuit controlling the controllable magnetic bearing; a motor for rotating the rotary shaft; and a compensator provided between the controllable magnetic bearing and the controlling circuit, compensating for characteristic variation resulting from individual difference of the controllable magnetic bearing.

As the variation in characteristics derived from individual difference is compensated in this manner, compatibility between the controllable magnetic bearing and the control circuit is established.

The compensator includes a detector detecting a sensor signal of the controllable magnetic bearing, an offset adjusting circuit correcting positional deviation from the center of the rotary shaft based on the sensor signal detected by the detector, a feedback gain adjusting circuit adjusting the gain of detection output of the detector, and a filter circuit for reducing proper oscillation of the rotary shaft.

Accordingly, proper oscillation of individual controllable magnetic bearing can be compensated for by the compensator, and compatibility between the controllable magnetic bearing and the control circuit is ensured.

Further, the gas circulation fan includes a housing accommodating the controllable magnetic bearing, and the compensator is provided in the housing.

As the compensator is accommodated in the housing of the controllable magnetic bearing, even when the control circuit fails, what is necessary is simply to replace the failed circuit with a new control circuit, and adjustment operation can be eliminated.

According to another aspect, the present invention provides a gas circulation fan for an excimer laser apparatus circulating laser gas in a chamber by fan rotation, including: a rotary shaft on which the fan is attached; a controllable magnetic bearing supporting, in a non-contact manner, the rotary shaft; a control circuit controlling the controllable magnetic bearing; a motor for rotating the rotary shaft; and an adjusting member for adjusting natural frequency of the rotary body rotating integrally with the rotary shaft.

In this manner, by the adjusting member for adjusting the natural frequency, variation in natural frequency of the mechanical body can be minimized.

Further, the adjusting member includes a weight detachably attached to the rotary shaft.

Thus, by adjusting the mass of the weight, variation of natural frequency can be suppressed.

Further, the adjusting member includes a female screw formed along the axial direction from one end surface side of the rotary shaft, and a natural frequency adjusting member having a male screw portion formed on an outer circumferential surface and moved forward/downward engaged with the female screw portion.

As the natural frequency adjusting member is provided, the addition of the center of gravity of the screw can be changed by changing the amount of screwing, and hence the natural frequency of the entire rotary shaft can be adjusted.

According to a still further aspect, the present invention provides a gas circulation fan for an excimer laser apparatus circulating laser gas in a chamber by fan rotation, including: a rotary shaft on which the fan is attached; a controllable magnetic bearing supporting, in a non-contact manner, the rotary shaft; a control circuit controlling the controllable magnetic bearing; and a motor for rotating the rotary shaft; wherein the control circuit includes a bandpass filter for removing natural oscillation frequency of the rotary shaft, and a frequency setting circuit for setting the set frequency of the bandpass filter to the natural frequency of the rotary shaft.

Therefore, even when the natural frequency of the rotary shaft varies, the frequency of the bandpass filter can automatically be adjusted on the side of the control circuit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
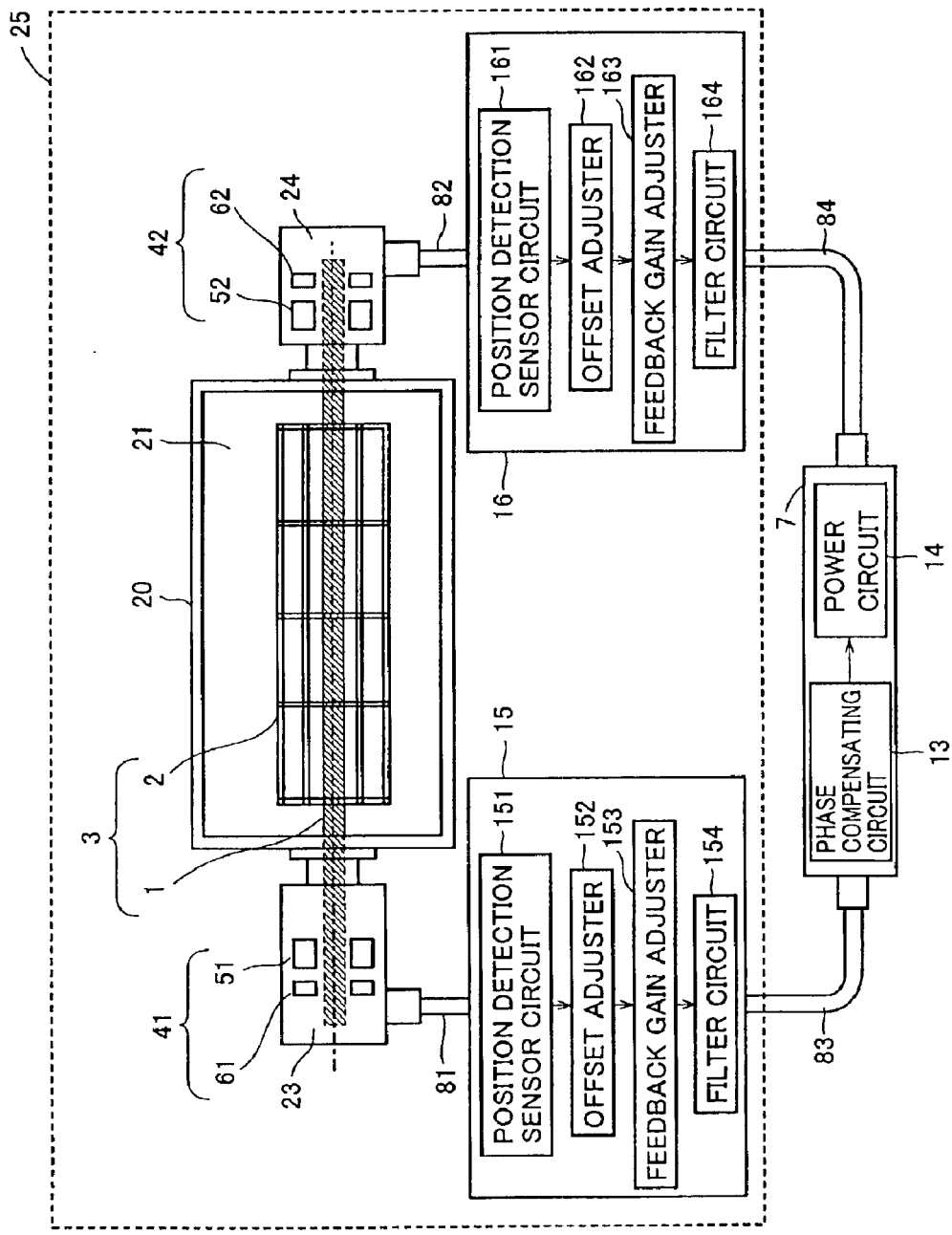
FIG. 1 shows a configuration of the magnetic bearing for a gas circulation fan of an excimer laser apparatus in accordance with a first embodiment of the present invention.

FIG. 1 is a block diagram representing a configuration of a mechanical unit and an electrical configuration, of the first embodiment of the present invention.

Figure 6:
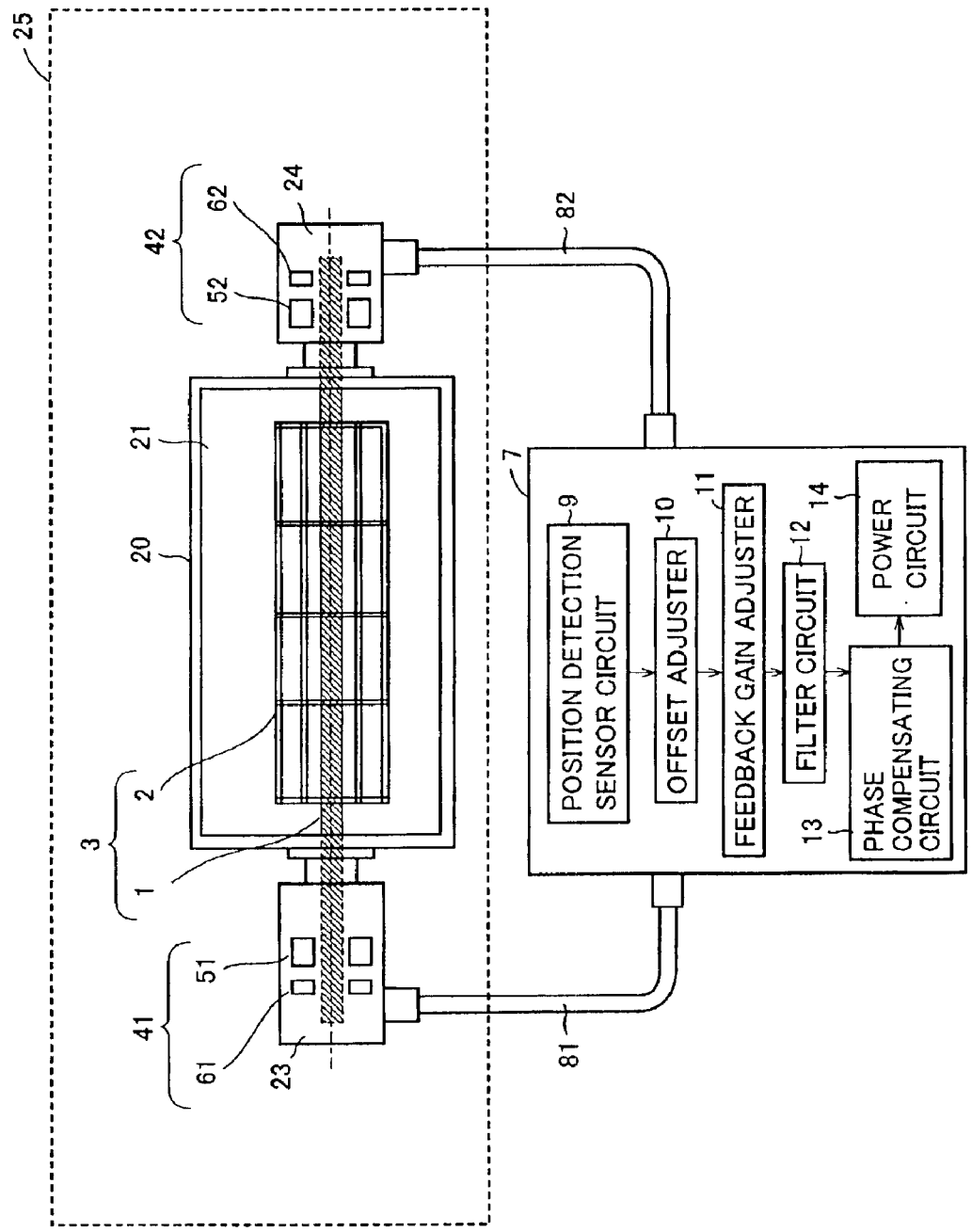
FIG. 6 shows a configuration of a magnetic bearing for gas circulation fan of a conventional excimer laser apparatus.

Referring to FIG. 1, in the present embodiment, portions that have limited compatibility between mechanical unit 25 and controller 7 shown in FIG. 6 are accommodated in relays 15 and 16. More specifically, in the conventional example shown in FIG. 6, compatibility between mechanical body unit 25 and controller 7 has been limited by position detection sensor circuit 9, offset adjuster 10, sensor feedback gain adjuster 11 and filter circuit 12.

Therefore, in the embodiment shown in FIG. 1, the circuit configurations that have limited the compatibility are accommodate in relays 15 and 16. More specifically, relay 15 includes position detection sensor circuit 151, offset adjuster 152, feedback gain adjuster 153 and filter circuit 154, while relay 16 includes position detection sensor 161, offset adjuster 162, feedback gain adjuster 163 and filter circuit 164. Relay 15 is connected to magnetic bearing 41 by means of a cable 81, and relay 16 is connected to magnetic bearing 42 by means of a cable 82. Further, relay 15 is connected to controller 7 by means of a cable 83, and relay 16 is connected to controller 7 by means of a cable 84. Only phase compensating circuit 13 and power circuit 14 are provided in controller 7.

Respective circuits in relay 15 are finely adjusted in accordance with the characteristics of magnetic bearing 41, while relay 16 is finely adjusted in accordance with the characteristics of magnetic bearing 42. Therefore, it becomes possible to attain compatibility between mechanical body unit 25 including relays 15 and 16 and controller 7. When controller 7 fails, for example, repair is completed simply by exchanging controller 7, which does not require any fine adjustment, and therefore, the adjusting operation can be eliminated.

Figure 2:
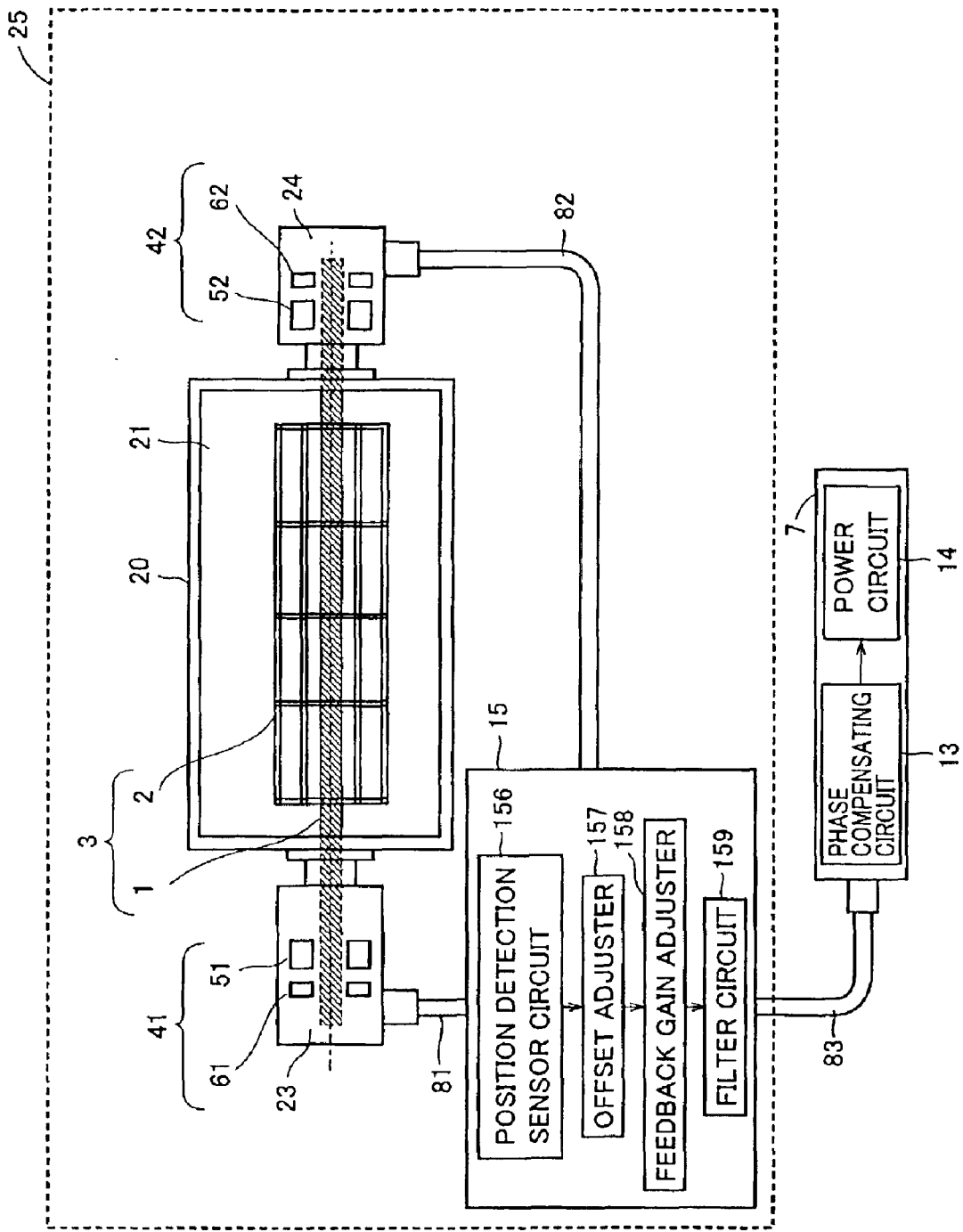
FIG. 2 shows a configuration of a mechanical body unit and a relay representing a modification of the first embodiment of the present invention.

FIG. 2 shows a modification of the mechanical body unit and the controller in accordance with an embodiment of the present invention. In the embodiment shown in FIG. 2, relays 15 and 16 shown in FIG. 1 are combined to be one relay 15. Relay 15 contains position detection sensor circuit 156, offset adjuster 157, feedback gain adjuster 158 and filter circuit 159 each having circuits corresponding to magnetic bearings 41 and 42, the relay 15 is connected to magnetic bearings 41 and 42 by cables 81 and 82, respectively, and the relay 15 is connected to external controller 7 by cable 83.

In this embodiment also, position detection sensor circuit 156, offset adjuster 157, feedback gain adjuster 158 and filter circuit 159 that have limited compatibility between mechanical body unit 25 and controller 7 are accommodated in relay 15. Therefore, compatibility between controller 7 and mechanical unit 25 including relay 15 can be attained.

Figure 3A:
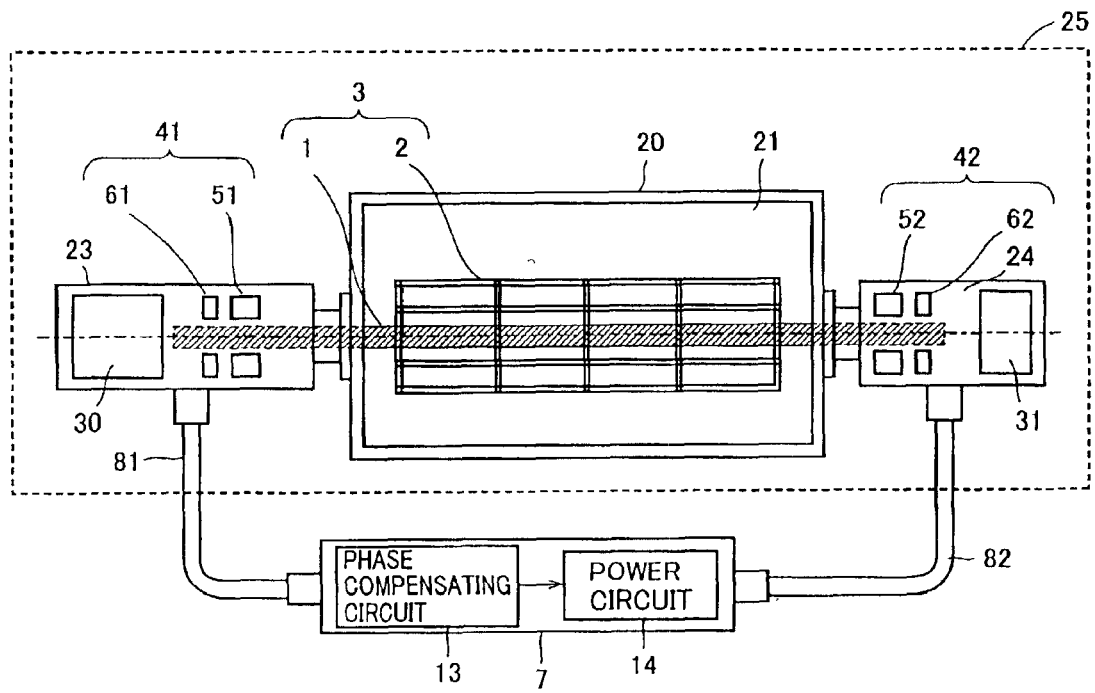
FIGS. 3A and 3B represent configurations of the magnetic bearing for gas circulation fan of an excimer laser apparatus in accordance with a second embodiment of the present invention.
Figure 3B:
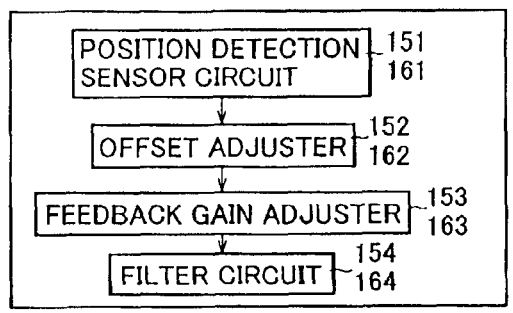

FIGS. 3A and 3B represent configurations of the mechanical unit and the controller in accordance with the second embodiment of the present invention. In the embodiment shown in FIGS. 3A and 3B, position detection sensor circuit 151, offset adjuster 152, feedback gain adjuster 153 and filter circuit 154 constituting relay 15 shown in FIG. 1 are provided on an inner substrate 30 within a housing 23, while position detection sensor circuit 161, offset adjuster 162, feedback gain adjuster 163 and filter circuit 164 constituting relay 16 are mounted on an inner substrate 31 in a housing 24. As respective circuit components are mounted on inner substrate 30 and 31, relays 15 and 16 shown in FIG. 1 can be eliminated, enabling further reduction in size. In this structure also, compatibility between mechanical body 25 and controller 7 can be attained.

FIGS. 4A to 4D represent a third embodiment of the present invention. When natural frequency of rotary body 3 including main shaft 1 varies because of processing accuracy error in manufacturing main shaft 1, it becomes necessary to readjust frequencies of filter circuits 154, 164 and 159 in the relay in inner substrates 30 and 31, to be in accordance with the natural frequency of rotary body 3, as described in the first and second embodiments.

In contrast, in the embodiment shown in FIGS. 4A to 4D, variation in proper oscillation of main shaft 1 is minimized, so as to eliminate adjustment of the set frequency of filter circuit 12. More specifically, in the example shown in FIG. 4A, a natural frequency adjusting weight 17 is attached to one end of main shaft 1, and in the example shown in FIG. 4B, natural frequency adjusting weight 17 is attached on the other side of main shaft 1. By attaching natural frequency adjusting weight 17 on main shaft 1, the mass is adjusted such that the natural frequency of main shaft 1 has a prescribed value (prescribed frequency of filter circuit 12 shown in FIG. 6).

Though natural frequency adjusting weight 17 is attached on one side or on the other side of main shaft 1, it may be attached to other position. By this method, individual difference in natural frequency of rotary body 3 including main shaft 1 can be eliminated. Therefore, it becomes unnecessary to arrange filter circuit 12 in relays 15 and 16 or on inner substrates 30 and 31, and a filter circuit can be arranged in controller 7. Thus, readjustment of set frequency of filter circuit 12 becomes unnecessary.

Figure 4A:
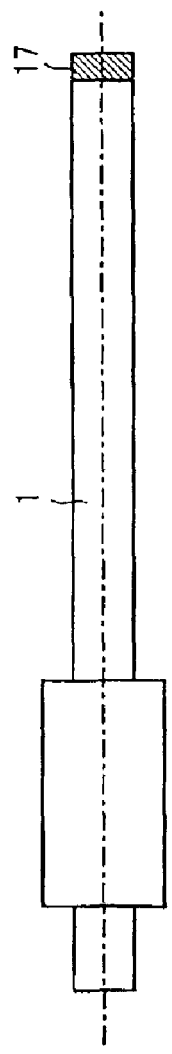
FIGS. 4A to 4D represent the main shaft natural frequency adjusting mechanism of the excimer laser apparatus in accordance with a third embodiment of the present invention.
Figure 4B:
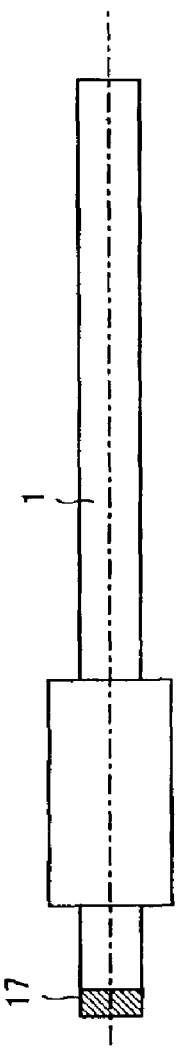
Figure 4C:
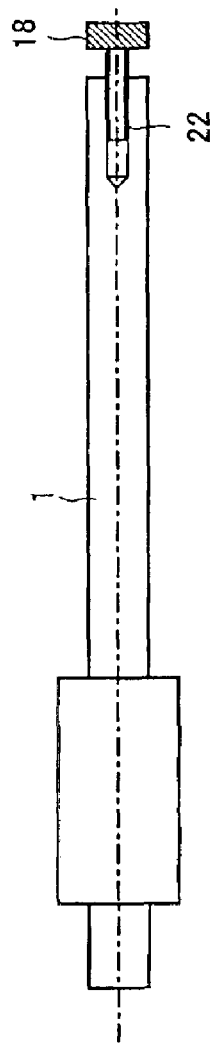
Figure 4D:
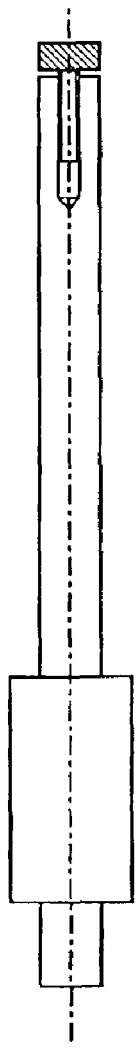

In the example shown in FIG. 4C, a natural frequency adjusting screw 18 is attached on one end surface of main shaft 1, in place of natural frequency adjusting weight 17. In this example, a female screw 22 is formed on one end of main shaft 1, and natural frequency adjusting screw 18 having male screw formed therein is engaged therewith. By changing the amount of screwing of natural frequency adjusting screw 18, the position of the center of gravity of the screw changes as shown in FIG. 4D, and hence the natural frequency of main shaft 1 as a whole can be adjusted.

Figure 5:
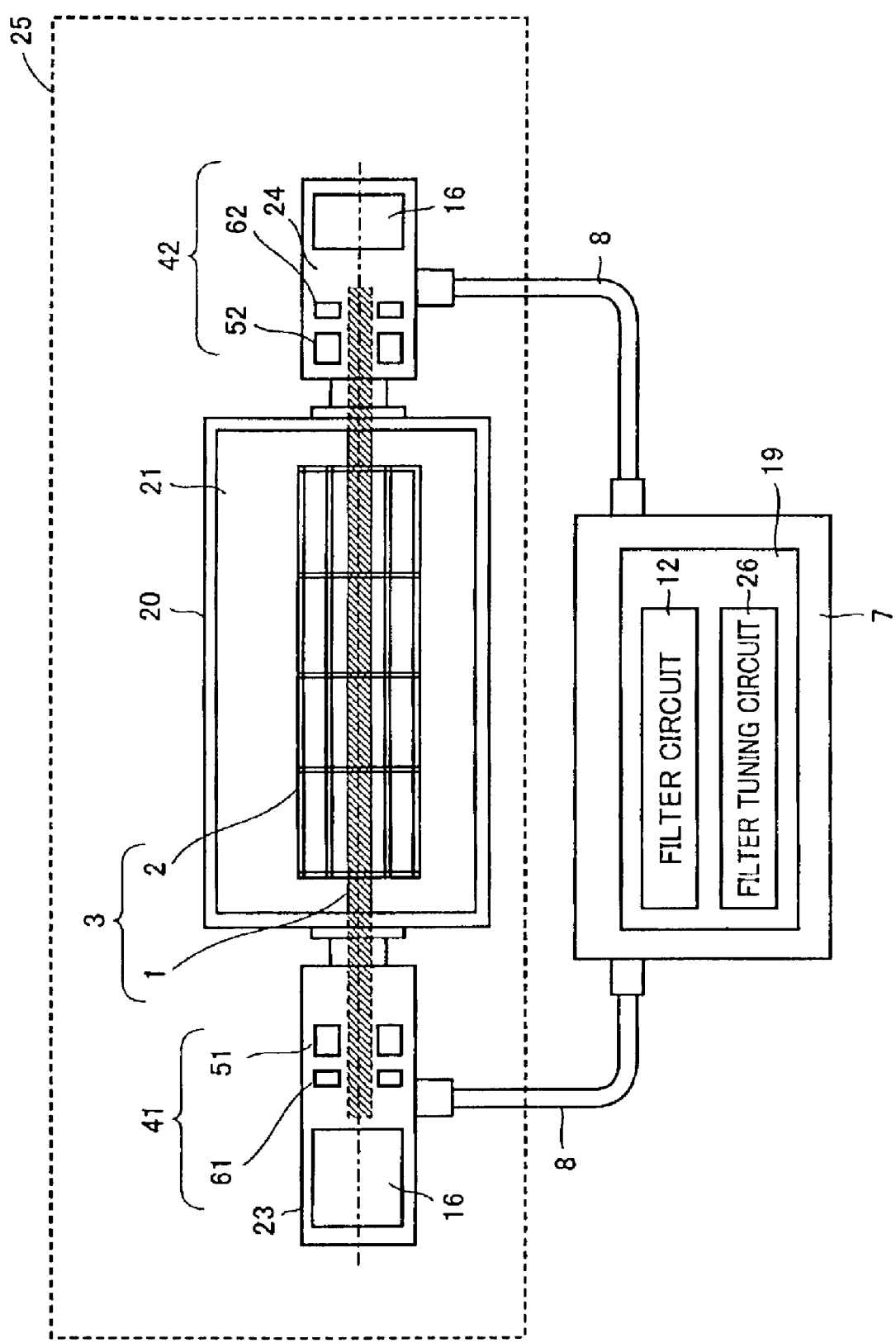
FIG. 5 shows a filter tuning mechanism for attenuating main shaft natural frequency of the excimer laser apparatus in accordance with a fourth embodiment of the present invention.

FIG. 5 shows configurations of mechanical body unit 25 and the controller in accordance with the fourth embodiment of the present invention. Similar to the third embodiment, in the present embodiment, when natural frequency of rotary body 3 including main shaft 1 varies because of processing accuracy error in manufacturing main shaft 1, the filter frequency is automatically adjusted by a digital control circuit 19 of controller 7. More specifically, in digital control circuit 19, a filter tuning control circuit 26 sets the frequency of filter circuit 12 to an expected natural frequency of rotary body 3 and activates magnetic bearings 41 and 42, and the frequency of filter circuit 12 is changed from a frequency little lower than the expected natural frequency of rotary shaft 3 to a frequency a little higher than the expected frequency, while measuring frequency characteristics at respective frequencies. Filter tuning control circuit 26 finds the frequency of filter circuit 12 at which the peak of proper oscillation becomes the smallest, and sets the thus found frequency as the prescribed frequency of the apparatus. By setting the frequency of the filter circuit 12 to the prescribed frequency thereafter, optimal control can automatically be attained.

Therefore, in accordance with the present embodiment, even when there is an individual difference in natural frequency of rotary body 3, the filter frequency can automatically be adjusted by digital control circuit 19. Therefore, it is unnecessary to take into consideration compatibility of mechanical unit 25.

As described above, according to the embodiments of the present invention, full compatibility between the mechanical body and the controller can be attained. Therefore, it is expected that efficiency in operation is improved at the site of production, and maintenance is facilitated. For example, at the site of production, a plurality of mechanical bodies may be adjusted by using one controller.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A gas circulation fan for an excimer laser apparatus circulating laser gas in a chamber by fan rotation, comprising:

a rotary shaft on which said fan is attached, and driven to rotate by a motor;

a controllable magnetic bearing having an electromagnet supporting, in a non-contact manner, said rotary shaft, and a position sensor detecting a position of said rotary shaft; and a control circuit controlling an output of said electromagnet based on an output signal of said position sensor;

said control circuit including a front-stage circuit adjusted in accordance with variation in characteristic resulting from individual differences of a rotating body including said fan and said rotary shaft and of said controllable magnetic bearing, and outputting a control signal based on the output signal of said position sensor, and a back-stage circuit supplying a current to said electromagnet according to said control signal, said front-stage circuit constituting a mechanical body unit together with said rotating body and said controllable magnetic bearing, said back-stage circuit being provided in a replaceable manner, separately from said mechanical body unit.

2. The gas circulation fan for an excimer laser apparatus according to claim 1, wherein said front-stage circuit includes a position detecting sensor circuit converting an amount of displacement of said rotary shaft to a voltage ratio based on the output signal of said position sensor, an offset adjusting circuit correcting positional deviation of said rotary shaft from the center, based on the output signal of said position detecting sensor circuit, a feedback gain adjusting circuit adjusting gain of said position detecting sensor circuit, and a filter circuit for reducing proper oscillation of said rotating body.

3. The gas circulation fan for an excimer laser apparatus according to claim 1, further comprising:

a housing accommodating said controllable magnetic bearing; wherein said front stage circuit is provided in said housing.

4. A gas circulation fan for an excimer laser apparatus circulating laser gas in a chamber by fan rotation, comprising:

a rotary shaft on which said fan is attached, and driven to rotate by a motor;

a controllable magnetic bearing supporting said rotary shaft in a non-contact manner;

a control circuit controlling said controllable magnetic bearing; and an adjusting member adjusting natural frequency of a rotating body including said fan and said rotary shaft, said adjusting member including a weight detachably attached on said rotary shaft.

5. A gas circulation fan for an excimer laser apparatus circulating laser gas in a chamber by fan rotation, comprising:

a rotary shaft on which said fan is attached, and driven to rotate by a motor; a controllable magnetic bearing supporting said rotary shaft in g non-contact manner;

a control circuit controlling said controllable magnetic bearing; and an adjusting member adjusting natural frequency of a rotating body including said fan and said rotary shaft, said adjusting member including a female screw portion formed along an axial direction from the side of one end surface of said rotary shaft, and a natural frequency adjusting member having a male screw portion formed on an outer circumferential surface and moved forward/backward engaged with said female screw portion.

6. A gas circulation fan for an excimer laser apparatus circulating laser gas in a chamber by fan rotation, comprising:

a rotary shaft on which said fan is attached, and driven to rotate by a motor;

a controllable magnetic bearing having an electromagnet supporting, in a non-contact manner, said rotary shaft in, and a position sensor detecting a position of said rotary shaft; and a control circuit controlling an output of said electromagnet based on an output signal of said position sensor, said control circuit including a filter circuit for removing a signal of natural oscillation frequency of a rotating body including said fan and said rotary shaft, and a frequency setting circuit for setting set frequency of said filter circuit to natural frequency of said rotary shaft.

* * * * *